US012059642B1

(12) United States Patent
Lin et al.

(10) Patent No.: US 12,059,642 B1
(45) Date of Patent: Aug. 13, 2024

(54) AUTOMOBILE OIL FILTER BASE ASSEMBLY AND AUTOMOBILE OIL FILTER RADIATOR ASSEMBLY

(71) Applicant: WENZHOU DEXIN AUTO PARTS CO., LTD., Wenzhou (CN)

(72) Inventors: Xiaofu Lin, Wenzhou (CN); Wanyi Lin, Wenzhou (CN); Feng Cai, Wenzhou (CN)

(73) Assignee: WENZHOU DEXIN AUTO PARTS CO., LTD., Wenzhou (CN)

( * ) Notice: Subject to any disclaimer, the term of this patent is extended or adjusted under 35 U.S.C. 154(b) by 0 days.

(21) Appl. No.: 18/381,179

(22) Filed: Oct. 18, 2023

(30) Foreign Application Priority Data

Aug. 25, 2023 (CN) ......................... 202322297197.7

(51) Int. Cl.
*F01M 11/03* (2006.01)
*B01D 35/00* (2006.01)
*F01M 1/10* (2006.01)

(52) U.S. Cl.
CPC ............. *B01D 35/005* (2013.01); *F01M 1/10* (2013.01); *F01M 11/03* (2013.01)

(58) Field of Classification Search
CPC .. F01M 11/03; F01M 2011/033; F01M 5/002; B01D 35/18; F01P 11/08; F28F 2280/06; F28F 9/0075; F28D 2021/0089; F28D 9/005
USPC ...................................................... 123/196 A
See application file for complete search history.

(56) References Cited

U.S. PATENT DOCUMENTS 4,423,708 A * 1/1984 Sweetland ............... F01P 11/08 123/196 R
7,353,794 B2 * 4/2008 Gruner ................... B01D 35/18 123/196 AB
8,104,581 B2 * 1/2012 Gendermann .......... F28F 27/02 123/196 AB
8,186,328 B2 * 5/2012 Kiemlen ................ F01M 5/002 123/41.31
11,339,692 B2 * 5/2022 Girondi ................... F28D 9/005
11,821,346 B2 * 11/2023 Chen .................... B01D 35/185
2008/0006229 A1 * 1/2008 Wilmink .................. F01P 11/06 123/196 AB
2014/0313806 A1 * 10/2014 Shinohara ............. H01L 23/473 363/141

* cited by examiner

*Primary Examiner* — Long T Tran
*Assistant Examiner* — James J Kim
(74) *Attorney, Agent, or Firm* — Bayramoglu Law Offices LLC

(57) ABSTRACT

An automobile oil filter radiator assembly is provided. The automobile oil filter radiator assembly includes a base and a radiator, where the base is elongated in shape through metal casting; one end of the base is integrally provided with a filter housing; the radiator is assembled on an upper surface of the base; the base is provided with an oil passage communicated with a filter and the radiator; the oil passage is longitudinally provided and divided into a first section and a second section; the first section is communicated with an inner chamber of the filter housing, and is provided with a first core opening extending towards the end of the base provided with the filter housing; the second section is provided with a second core opening extending towards the upper surface of the base; and the second core opening is sealed with a bottom surface of the radiator.

16 Claims, 6 Drawing Sheets

10
23
7
6
8
1
15
11
12
13

AUTOMOBILE OIL FILTER BASE ASSEMBLY AND AUTOMOBILE OIL FILTER RADIATOR ASSEMBLY

CROSS REFERENCE TO THE RELATED APPLICATIONS

This application is based upon and claims priority to Chinese Patent Application No. 202322297197.7, filed on Aug. 25, 2023, the entire contents of which are incorporated herein by reference.

TECHNICAL FIELD

The present disclosure relates to an improved automobile oil filter base assembly and an improved automobile oil filter radiator assembly.

BACKGROUND

The automobile oil filter, located in the engine lubrication system, is configured to filter out harmful impurities in the oil from the oil pan, allowing the filtered oil to be supplied to components such as cranks for lubrication, cooling, and cleaning, thereby extending the lifespan of the components.

The oil filter base is mainly made of plastic, which has a light weight and a low processing cost, but has the following problems. 1. The welding junction of the oil hole is prone to leakage, and once a leak occurs, the plastic oil filter base must be replaced as a whole. Therefore, the plastic oil filter base has a short service life and high maintenance cost. 2. The plastic oil filter base has a poor heat dissipation effect. 3. The oil passage of the plastic oil filter base is long, and the core to be pulled is long. A long core is prone to deform and cause deformation of the oil passage, affecting the communication of the oil passage and causing core pulling failure, thereby increasing the difficulty of processing.

SUMMARY

In view of the technical problems mentioned in the Background, a technical problem to be solved by the present disclosure is to provide an automobile oil filter base assembly and an automobile oil filter radiator assembly with a long service life, low leakage, low maintenance cost, and desired heat dissipation effect.

To solve the above technical problem, the present disclosure adopts the following technical solutions. The automobile oil filter base assembly includes a base elongated in shape through metal casting, where

- one end of the base is integrally provided with a filter housing;
- the base is provided with an upper surface assembled with a radiator; and
- the base is further provided with an oil passage communicated with a filter and the radiator; the oil passage is longitudinally provided and divided into a first section and a second section; the first section is communicated with an inner chamber of the filter housing, and is provided with a first core opening extending towards the end of the base provided with the filter housing; the second section is provided with a second core opening extending towards the upper surface of the base; and the second core opening is sealed with a bottom surface of the radiator.

In the present disclosure, the oil passage is divided into two sections, and there are two cores for casting. The two cores are matched with the first section and the second section of the oil passage respectively, reducing a length of the cores. Thus, the cores are not easily deformed, thereby enhancing stability, improving the success rate of oil passage processing, ensuring the stable shape of the oil passage, and achieving desired molding quality. In addition, the present disclosure adopts metal casting, which achieves a desired heat dissipation effect. Especially, the oil in the oil passage directly contacts the bottom surface of the radiator through the second core opening, further improving the oil cooling effect.

Preferably, the upper surface of the base is provided with positioning pins corresponding to positioning holes in the bottom surface of the radiator; and there are at least two positioning pins. When the radiator is mounted, the positioning holes on the radiator are aligned with the positioning pins on the base. The design ensures the correct mounting positions of the radiator and the base, improving the mounting efficiency.

Preferably, a lower surface of the base is provided with a first oil outlet and a second oil outlet;

- the first oil outlet is provided with a first oil hole that extends upwards and is communicated with the second section; and
- the base is further provided with an oil passage connection channel; the oil passage connection channel is longitudinally provided, and is provided with a third core opening extending towards the end of the base provided with the filter housing; the oil passage connection channel is communicated with the inner chamber of the filter housing; and the second oil outlet extends upwards, and is communicated with the oil passage connection channel.

Preferably, the first core opening and the third core opening each are provided therein with an internal thread and are threaded to a sealing plug; outer end surfaces of the first core opening and the third core opening are covered with an integrated sealing ring; and the sealing plug is pressed against the integrated sealing ring. The threaded connection eases mounting and replacement. The sealing ring ensures a desired sealing effect of the first core opening and the second core opening. In addition, the integrated sealing ring has a restrictive effect on the sealing of the first core opening and the second core opening, ensuring that they are not easily deformed, thereby improving the sealing effect.

Preferably, the upper surface of the base is provided with a cooling inlet and a cooling outlet;

- the cooling inlet is provided with a second oil hole that extends downwards; and the second oil hole and the first oil hole form an overlapping part and are communicated with each other; and
- the cooling outlet extends downwards and is communicated with the first section of the oil passage.

Preferably, the first oil hole is communicated with a first sensor mounting hole and a second sensor mounting hole; and the first sensor mounting hole and the second sensor mounting hole each are provided with an internal thread for mounting. Similarly, the threaded connection eases mounting and disassembly and achieves a desired sealing effect.

Preferably, a circular sealing groove is provided around the second core opening; and the sealing groove is provided therein with a sealing ring. The sealing groove has a limiting effect on the sealing ring, avoiding the sealing ring from deviating, thereby improving the sealing effect between the second core opening and the bottom surface of the radiator.

Preferably, the second core opening is rectangular in shape to increase an area of the second core opening, thereby increasing a contact area with the bottom surface of the radiator and improving the oil cooling effect.

An automobile oil filter radiator assembly includes an automobile oil filter base assembly and a radiator, where the automobile oil filter base assembly includes a base elongated in shape through metal casting;

one end of the base is integrally provided with a filter housing;

the base is provided with an upper surface assembled with a radiator;

the base is further provided with an oil passage communicated with a filter and the radiator; the oil passage is longitudinally provided and divided into a first section and a second section; the first section is communicated with an inner chamber of the filter housing, and is provided with a first core opening extending towards the end of the base provided with the filter housing; and the second section is provided with a second core opening extending towards the upper surface of the base; and the radiator is assembled on the upper surface of the base; and the bottom surface of the radiator is sealed with the second core opening.

DETAILED DESCRIPTION OF THE EMBODIMENTS

Figure 1:
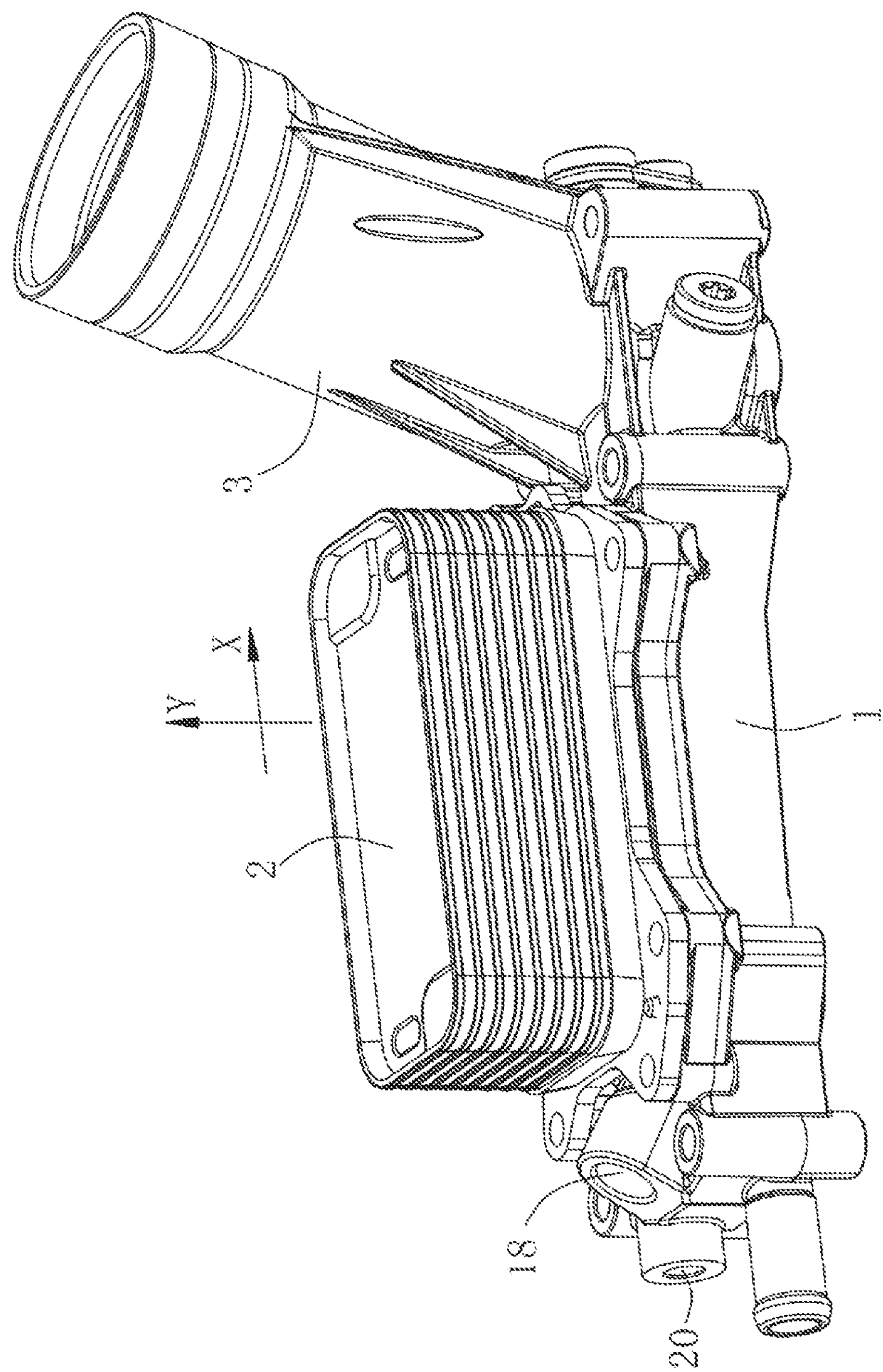
FIG. 1 is a schematic diagram of an automobile oil filter radiator assembly.
Figure 2:
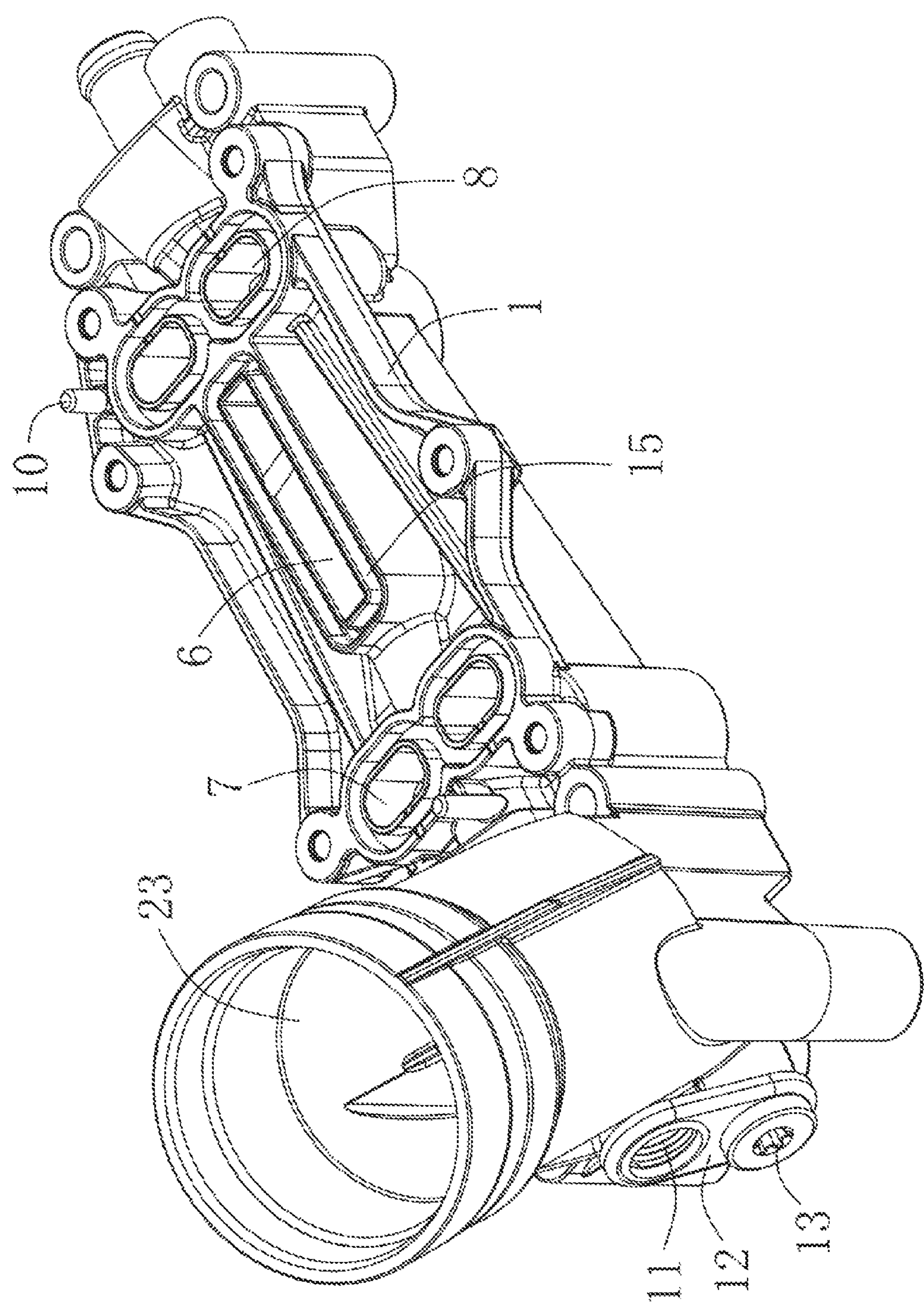
FIG. 2 is a first schematic diagram of an automobile oil filter base assembly.
Figure 3:
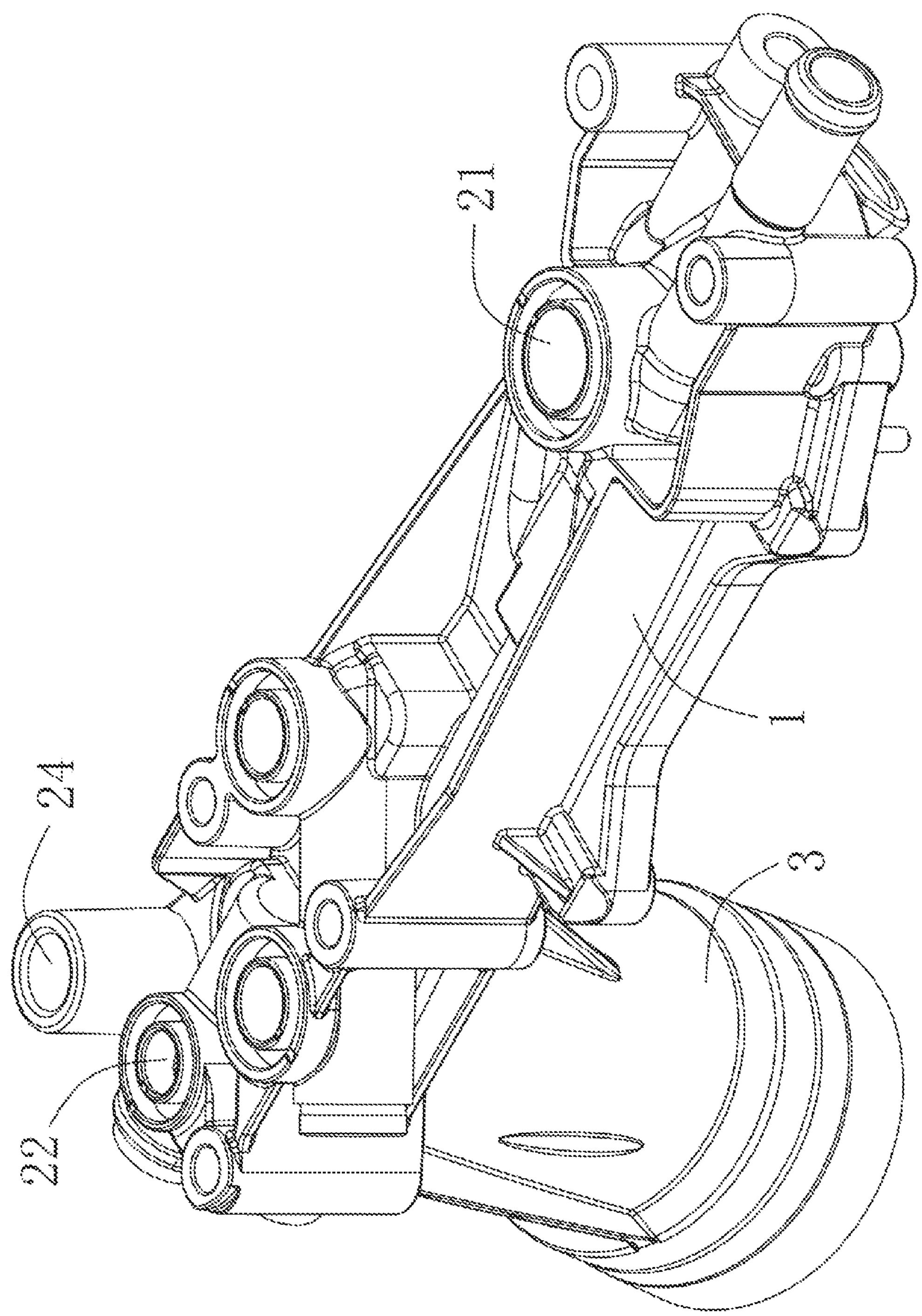
FIG. 3 is a second schematic diagram of the automobile oil filter base assembly.
Figure 4:
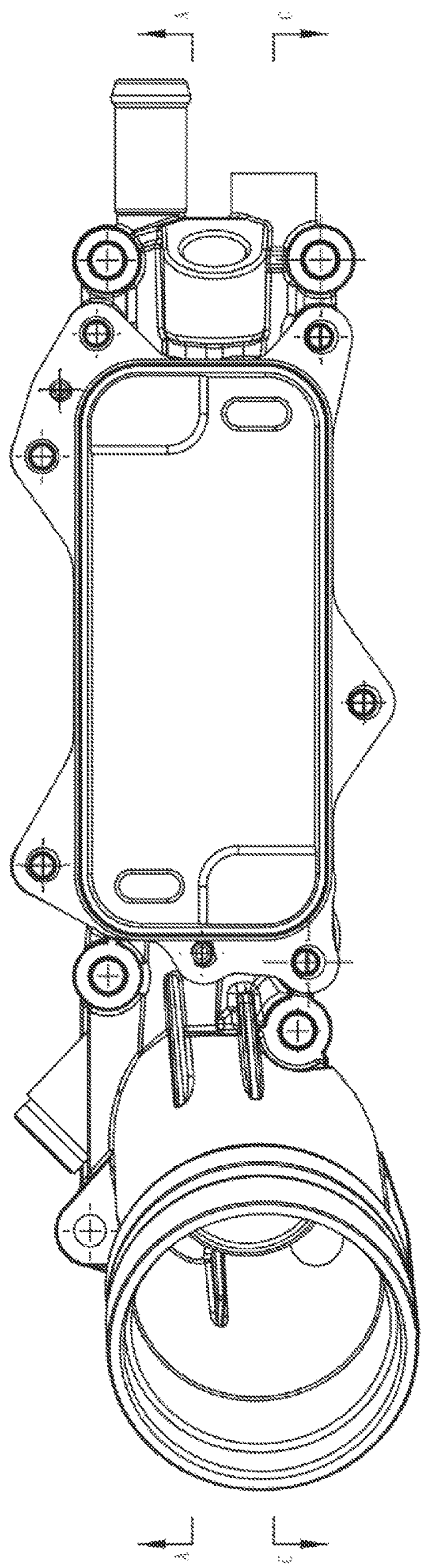
FIG. 4 is a schematic diagram of the automobile oil filter radiator assembly.
Figure 5:
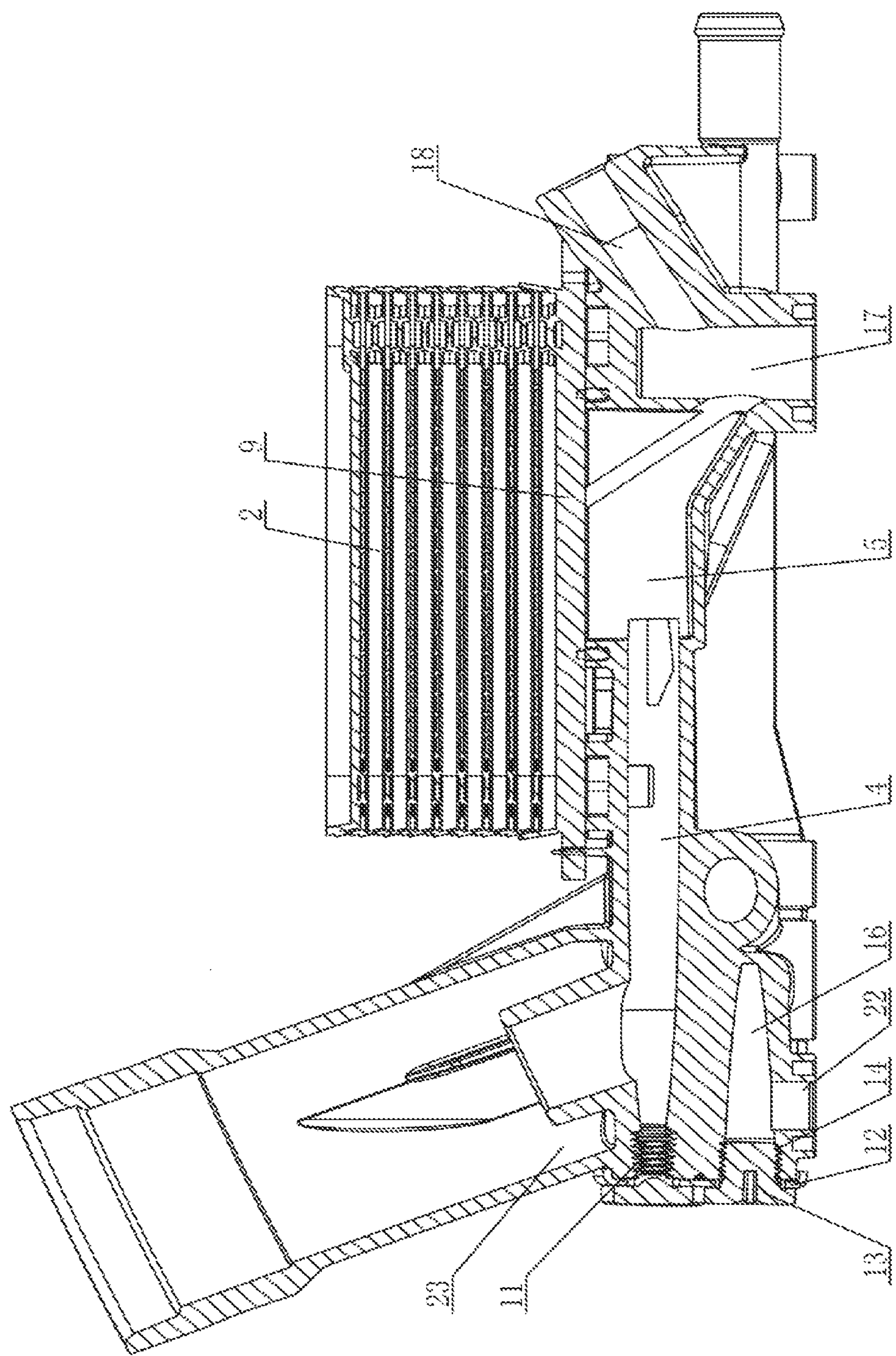
FIG. 5 is a section view taken along line A-A shown in FIG. 4.
Figure 6:
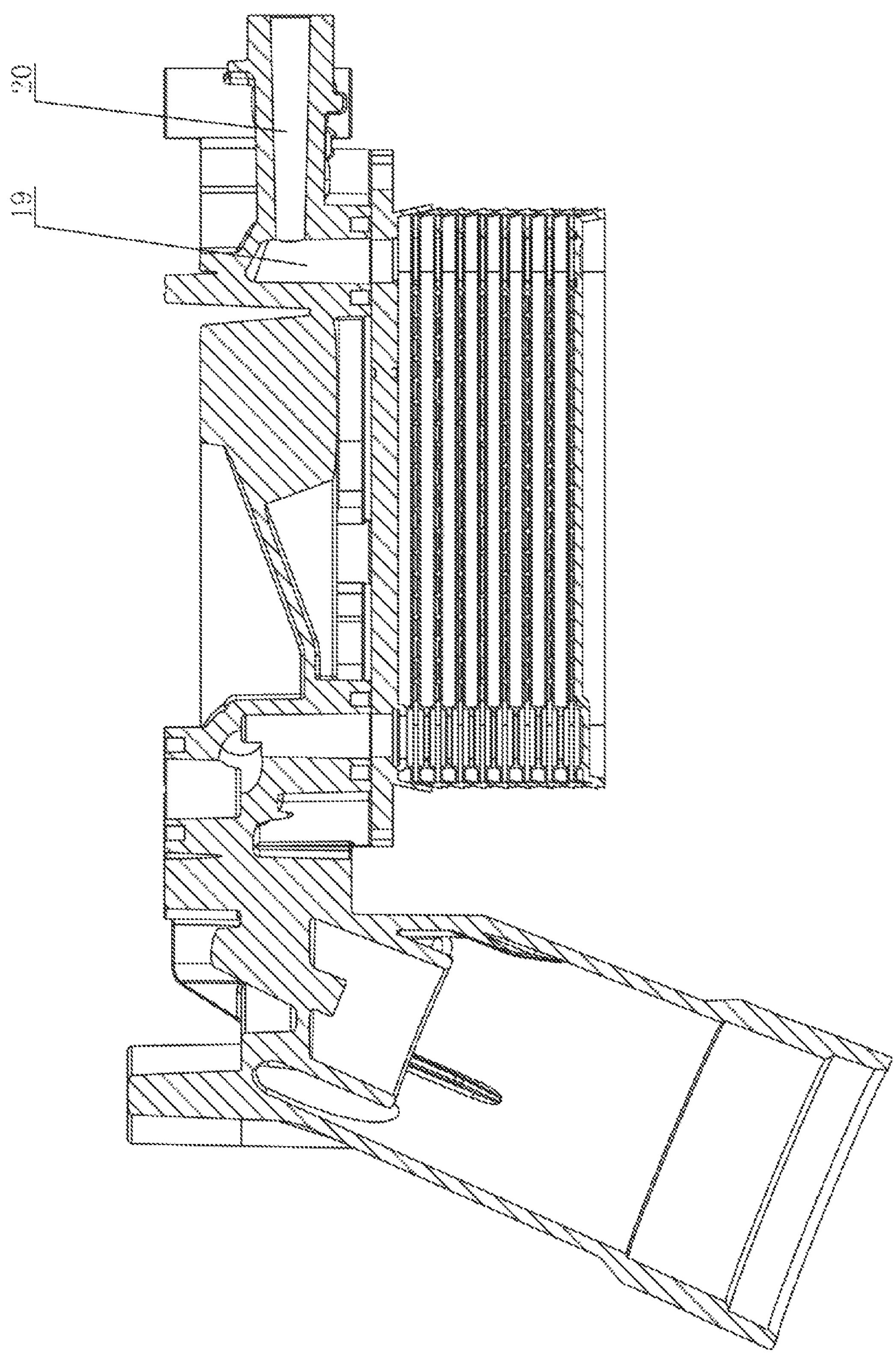
FIG. 6 is a section view taken along line C-C shown in FIG. 4.

According to the drawings, the relevant details and working principles of the implementations and embodiments of the present disclosure are described as follows. In the figure, an X-axis indicates a longitudinal direction, and a Y-axis indicates a vertical direction. An automobile oil filter radiator assembly includes an automobile oil filter base assembly and radiator 2. The automobile oil filter base assembly includes base 1. The base is a slender metal casting. One end of the base is integrally provided with filter housing 3. The filter housing is provided with oil inlet 24. The base is provided with an upper surface assembled with the radiator. The base is further provided with an oil passage communicated with a filter and the radiator. The oil passage is longitudinally provided and divided into first section 4 and second section 5. The first section is communicated with inner chamber 23 of the filter housing, and the first section 4 is provided with first core opening 11 extending towards the end of the base provided with the filter housing. The second section 5 is provided with second core opening 6 extending towards the upper surface of the base. The second core opening is sealed with bottom surface 9 of the radiator. The first core opening and the second core opening are configured to pull a cast core. After the core is removed from the first core opening and the second core opening, the oil passage is formed in the base. A lower surface of the base is provided with first oil outlet 21 and second oil outlet 22. The first oil outlet is provided with first oil hole 17 that extends upwards. The first oil hole is communicated with the second section 5 of the oil passage. The base is further provided with oil passage connection channel 16. The oil passage connection channel is longitudinally provided, and is provided with third core opening 14 extending towards the end of the base provided with the filter housing. The oil passage connection channel is communicated with the inner chamber 23 of the filter housing. The second oil outlet 22 extends upwards, and is communicated with the oil passage connection channel 16. The upper surface of the base is provided with cooling inlet 8 and cooling outlet 7. The cooling inlet 8 is provided with second oil hole 19 that extends downwards. The second oil hole 19 and the first oil hole 17 form an overlapping part and are communicated with each other. The cooling outlet 7 extends downwards and is communicated with the first section 4 of the oil passage. The radiator 2 is assembled on the upper surface of the base. Oil in the oil passage is led to the radiator through the cooling outlet and the cooling inlet. After the oil is cooled by the radiator, the oil returns to the oil passage, thereby reducing the overall oil temperature. The bottom surface 9 of the radiator can be connected to the upper surface of the base through a screw. To enhance the sealing effect between the second core opening and the bottom surface of the radiator, circular sealing groove 15 is provided around the second core opening. The sealing groove is provided therein with a sealing ring. The sealing groove has a limiting effect on the sealing ring, avoiding the sealing ring from deviating, thereby improving the sealing effect between the second core opening 6 and the bottom surface of the radiator 9. When the radiator is mounted on the upper surface of the base, the bottom surface of the radiator is pressed against the sealing ring. Preferably, the second core opening is rectangular in shape to increase an area of the second core opening, thereby increasing a contact area with the bottom surface of the radiator and improving the oil cooling effect.

In the present disclosure, the oil passage is divided into two sections, and there are two cores for casting. The two cores are matched with the first section 4 and the second section 5 of the oil passage respectively, reducing a length of the cores. Thus, the cores are not easily deformed, thereby enhancing stability, improving the success rate of oil passage processing, ensuring the stable shape of the oil passage, and achieving desired molding quality. In addition, the present disclosure adopts metal casting, which achieves a desired heat dissipation effect. Especially, the oil in the oil passage directly contacts the bottom surface of the radiator through the second core opening, further improving the oil cooling effect.

The upper surface of the base is provided with positioning pins 10 corresponding to positioning holes in the bottom surface of the radiator. There are at least two positioning pins. When the radiator is mounted, the positioning holes on the radiator are aligned with the positioning pins on the base. The design ensures the correct mounting positions of the radiator and the base, improving the mounting efficiency.

The first core opening 11 and the third core opening 14 each are provided therein with an internal thread and are threaded to sealing plug 13. Outer end surfaces of the first core opening and the third core opening are covered with integrated sealing ring 12. The sealing plug is pressed against the integrated sealing ring. The threaded connection eases mounting and replacement. The sealing ring ensures a desired sealing effect of the first core opening and the second core opening. In addition, the integrated sealing ring has a restrictive effect on the sealing of the first core opening and the second core opening, ensuring that they are not easily deformed, thereby improving the sealing effect.

The first oil hole 17 is communicated with first sensor mounting hole 18 and second sensor mounting hole 20. The first sensor mounting hole and the second sensor mounting hole each are provided with an internal thread for mounting. A temperature sensor for detecting an oil temperature and a pressure sensor for detecting an oil pressure are threaded to the first sensor mounting hole or the second sensor mounting hole. The temperature sensor and the pressure sensor are easy to mount and disassemble, and have a desired sealing effect.

A working principle of the present disclosure is as follows. The oil enters the filter housing 3 through the oil inlet 24. After the oil is filtered by the filter, it enters the first section 4 of the oil passage and the oil passage connection channel 16. A part of the oil is discharged from the second oil outlet 22 through the oil passage connection channel 16, while a part of the oil enters the radiator 2 from the cooling outlet 7 through the first section 4 of the oil passage. After this part of oil is cooled by the radiator, it returns to the oil passage 4 from the cooling inlet 8, and is discharged from the first oil outlet 21. A part of the oil is directly discharged from the first oil outlet 21 through the first section 4 and the second section 5 of the oil passage. When the oil passes through the second section 5, it comes into extensive contact with the bottom surface of the radiator, allowing this part of the oil to be cooled, so as to reduce the temperature of the oil. The pressure sensor and the temperature sensor are configured to acquire the oil temperature and oil pressure in the oil passage.

What is claimed is:

1. An automobile oil filter base assembly, comprising a base elongated in shape through metal casting, wherein one end of the base is integrally provided with a filter housing;

the base is provided with an upper surface assembled with a radiator; and the base is further provided with an oil passage communicated with the filter housing and the radiator; the oil passage is longitudinally provided and divided into a first section and a second section; the first section is communicated with an inner chamber of the filter housing, and is provided with a first core opening extending towards the end of the base provided with the filter housing; the second section is provided with a second core opening extending towards the upper surface of the base; and the second core opening is sealed with a bottom surface of the radiator, wherein the base includes a cooling inlet and a cooling outlet that are configured such that oil of said oil passage is led through the radiator through the cooling inlet and the cooling outlet, wherein the second core opening extends between the cooling inlet and the cooling outlet, and wherein the second core opening is sealed and covered by the radiator to prevent the oil from passing between the radiator and the oil passage through the second core opening.

2. The automobile oil filter base assembly according to claim 1, wherein the upper surface of the base is provided with positioning pins corresponding to positioning holes in the bottom surface of the radiator; and there are at least two positioning pins.

3. The automobile oil filter base assembly according to claim 1, wherein a lower surface of the base is provided with a first oil outlet and a second oil outlet;

the first oil outlet is provided with a first oil hole, wherein the first oil hole extends upwards and is communicated with the second section; and the base is further provided with an oil passage connection channel; the oil passage connection channel is longitudinally provided, and is provided with a third core opening extending towards the end of the base provided with the filter housing; the oil passage connection channel is communicated with the inner chamber of the filter housing; and the second oil outlet extends upwards, and is communicated with the oil passage connection channel.

4. The automobile oil filter base assembly according to claim 3, wherein the first core opening and the third core opening each are provided therein with an internal thread and are threaded to a sealing plug; outer end surfaces of the first core opening and the third core opening are covered with an integrated sealing ring; and the sealing plug is pressed against the integrated sealing ring.

5. The automobile oil filter base assembly according to claim 3, wherein the cooling inlet is provided with a second oil hole, wherein the second oil hole extends downwards; and the second oil hole and the first oil hole form an overlapping part and are communicated with each other; and the cooling outlet extends downwards and is communicated with the first section of the oil passage.

6. The automobile oil filter base assembly according to claim 3, wherein the first oil hole is communicated with a first sensor mounting hole and a second sensor mounting hole; and the first sensor mounting hole and the second sensor mounting hole each are provided with an internal thread for mounting.

7. The automobile oil filter base assembly according to claim 1, wherein a circular sealing groove is provided around the second core opening; and the circular sealing groove is provided therein with a sealing ring.

8. The automobile oil filter base assembly according to claim 1, wherein the second core opening is rectangular in shape.

9. An automobile oil filter radiator assembly, comprising:

the automobile oil filter base assembly according to claim 1; and a radiator assembled on the upper surface of the base, wherein the bottom surface of the radiator is sealed with the second core opening.

10. The automobile oil filter radiator assembly according to claim 9, wherein in the automobile oil filter base assembly, the upper surface of the base is provided with positioning pins corresponding to positioning holes in the bottom surface of the radiator; and there are at least two positioning pins.

11. The automobile oil filter radiator assembly according to claim 9, wherein in the automobile oil filter base assembly, a lower surface of the base is provided with a first oil outlet and a second oil outlet;

the first oil outlet is provided with a first oil hole, wherein the first oil hole extends upwards and is communicated with the second section; and the base is further provided with an oil passage connection channel; the oil passage connection channel is longitudinally provided, and is provided with a third core opening extending towards the end of the base provided with the filter housing; the oil passage connection channel is communicated with the inner chamber of the filter housing; and the second oil outlet extends upwards, and is communicated with the oil passage connection channel.

12. The automobile oil filter radiator assembly according to claim 11, wherein in the automobile oil filter base assembly, the first core opening and the third core opening each are provided therein with an internal thread and are threaded to a sealing plug; outer end surfaces of the first core opening and the third core opening are covered with an integrated sealing ring; and the sealing plug is pressed against the integrated sealing ring.

13. The automobile oil filter radiator assembly according to claim 11, wherein the cooling inlet is provided with a second oil hole, wherein the second oil hole extends downwards; and the second oil hole and the first oil hole form an overlapping part and are communicated with each other; and the cooling outlet extends downwards and is communicated with the first section of the oil passage.

14. The automobile oil filter radiator assembly according to claim 11, wherein in the automobile oil filter base assembly, the first oil hole is communicated with a first sensor mounting hole and a second sensor mounting hole; and the first sensor mounting hole and the second sensor mounting hole each are provided with an internal thread for mounting.

15. The automobile oil filter radiator assembly according to claim 9, wherein in the automobile oil filter base assembly, a circular sealing groove is provided around the second core opening; and the circular sealing groove is provided therein with a sealing ring.

16. The automobile oil filter radiator assembly according to claim 9, wherein in the automobile oil filter base assembly, the second core opening is rectangular in shape.

* * * * *